United States Patent
Ishida et al.

(10) Patent No.: US 6,189,462 B1
(45) Date of Patent: Feb. 20, 2001

(54) BURNING/MELTING METHOD OF WASTE MELTING FURNACE

(75) Inventors: Yoshihiro Ishida; Youichi Tawara; Yasuhiko Kato; Yoshihiro Ono; Kazuhiro Kuribayashi; Norio Fukinaka; Hachiro Harajiri; Kazuki Murahashi, all of Kitakyushu (JP)

(73) Assignee: Nippon Steel Corporation, Tokyo (JP)

( * ) Notice: Under 35 U.S.C. 154(b), the term of this patent shall be extended for 0 days.

(21) Appl. No.: 09/029,103
(22) PCT Filed: Jun. 23, 1997
(86) PCT No.: PCT/JP97/02149
  § 371 Date: Feb. 20, 1998
  § 102(e) Date: Feb. 20, 1998
(87) PCT Pub. No.: WO97/49954
  PCT Pub. Date: Dec. 31, 1997

(30) Foreign Application Priority Data

Jun. 24, 1996 (JP) .................................................. 8-163458
Jun. 24, 1996 (JP) .................................................. 8-163459
Jun. 24, 1996 (JP) .................................................. 8-163460

(51) Int. Cl.[7] ................................ F23L 7/00; F23G 5/04; F23G 5/24; F23G 5/50
(52) U.S. Cl. ......................... 110/346; 110/348; 110/345; 110/190
(58) Field of Search .................................. 110/224, 229, 110/230, 231, 235, 345, 346, 342, 348, 185, 186, 188, 190; 266/47

(56) References Cited

U.S. PATENT DOCUMENTS

| 3,729,298 | 4/1973 | Anderson . | |
|---|---|---|---|
| 3,894,497 | * 7/1975 | Helke et al. | 110/346 |
| 4,210,087 | * 7/1980 | Melan et al. | 110/346 |
| 4,306,507 | * 12/1981 | Metz | 110/190 X |
| 4,346,661 | * 8/1982 | Nakamura | 110/235 X |
| 4,635,573 | * 1/1987 | Santen | 110/346 |

(List continued on next page.)

FOREIGN PATENT DOCUMENTS

| 41 04 507 A1 | * 10/1992 | (DE) | 110/346 |
|---|---|---|---|
| 46-34349 | 10/1971 | (JP) . | |
| 52-24790 | 7/1977 | (JP) . | |
| 55-089612 | 7/1980 | (JP) . | |
| 57-12216 A2 | * 1/1982 | (JP) . | |
| 57-12216 | 1/1982 | (JP) . | |
| 58-13916 A2 | * 1/1983 | (JP) . | |
| 58-13916 | 1/1983 | (JP) . | |
| 60-11766 | * 3/1985 | (JP) | 110/348 |
| 1-184314 | 7/1989 | (JP) . | |
| 2-192508 | 7/1990 | (JP) . | |

(List continued on next page.)

OTHER PUBLICATIONS

Patent Abstracts of Japan, vol. 1996, No. 08, Aug. 30, 1996 JP 08 094031 A (NKK Corp.), Apr. 12, 1996.
Patent Abstracts of Japan, vol. 004, No. 132 (M–032), Sep. 17, 1980 JP 55 089612 A (Nippon Steel Corp.), Jul. 7, 1980.

Primary Examiner—Carl D. Price
Assistant Examiner—Ljiljana V. Ciric
(74) Attorney, Agent, or Firm—Kenyon & Kenyon (57) ABSTRACT

Waste material containing combustible waste substances and incombustible waste substances along with carbonic massive combustibles are feed for passage in a furnace in the form of packed layers. Lower stage tuyeres feed burning support gas in the burning and melting zone of the furnace. Upper stage tuyeres feed burning support gas in the heat decomposing zone of the furnace. Total oxygen fed by the upper and lower tuyeres is 130 to 600 $Nm^3$ per one ton of waste. The ratio of the quantity of oxygen fed from the upper stage tuyeres to the total quantity of oxygen fed from both the upper and lower stage tuyeres is 0.2 to 0.8. Oxygen fed from the lower stage tuyeres is at least 0.8 times the theoretical oxygen required for burning the carbonic massive combustibles.

5 Claims, 4 Drawing Sheets

U.S. PATENT DOCUMENTS

| | | | |
|---|---|---|---|
| 4,655,146 | * | 4/1987 | Lemelson .......................... 110/188 X |
| 4,712,491 | * | 12/1987 | Schmidt ............................... 110/346 |
| 5,127,344 | * | 7/1992 | Katsui ............................. 110/346 X |
| 5,191,845 | * | 3/1993 | Spliethoff ............................ 110/346 |
| 5,628,261 | * | 5/1997 | Beckstead et al. .............. 110/188 X |

FOREIGN PATENT DOCUMENTS

| | | |
|---|---|---|
| 4-122488 | 4/1992 | (JP) . |
| 08094031 | 4/1996 | (JP) . |
| 8-159436 | 6/1996 | (JP) . |

* cited by examiner

BURNING/MELTING METHOD OF WASTE MELTING FURNACE

TECHNICAL FIELD

The present invention relates to an optimum method of disposing of waste to be reprocessed, such as general waste and industrial waste, in a waste melting furnace and, more particularly, to a burning and melting method by which the operation of the waste melting furnace can be stabilized even if the composition of the waste is changed and further the method can be applied to the disposal of various compositions of waste and furthermore the method can be applied to wide area waste disposal and to the disposal of incineration residue, reclaimed waste and sludge when they are disposed of in the same waste melting furnace.

BACKGROUND ART

Figure 1:
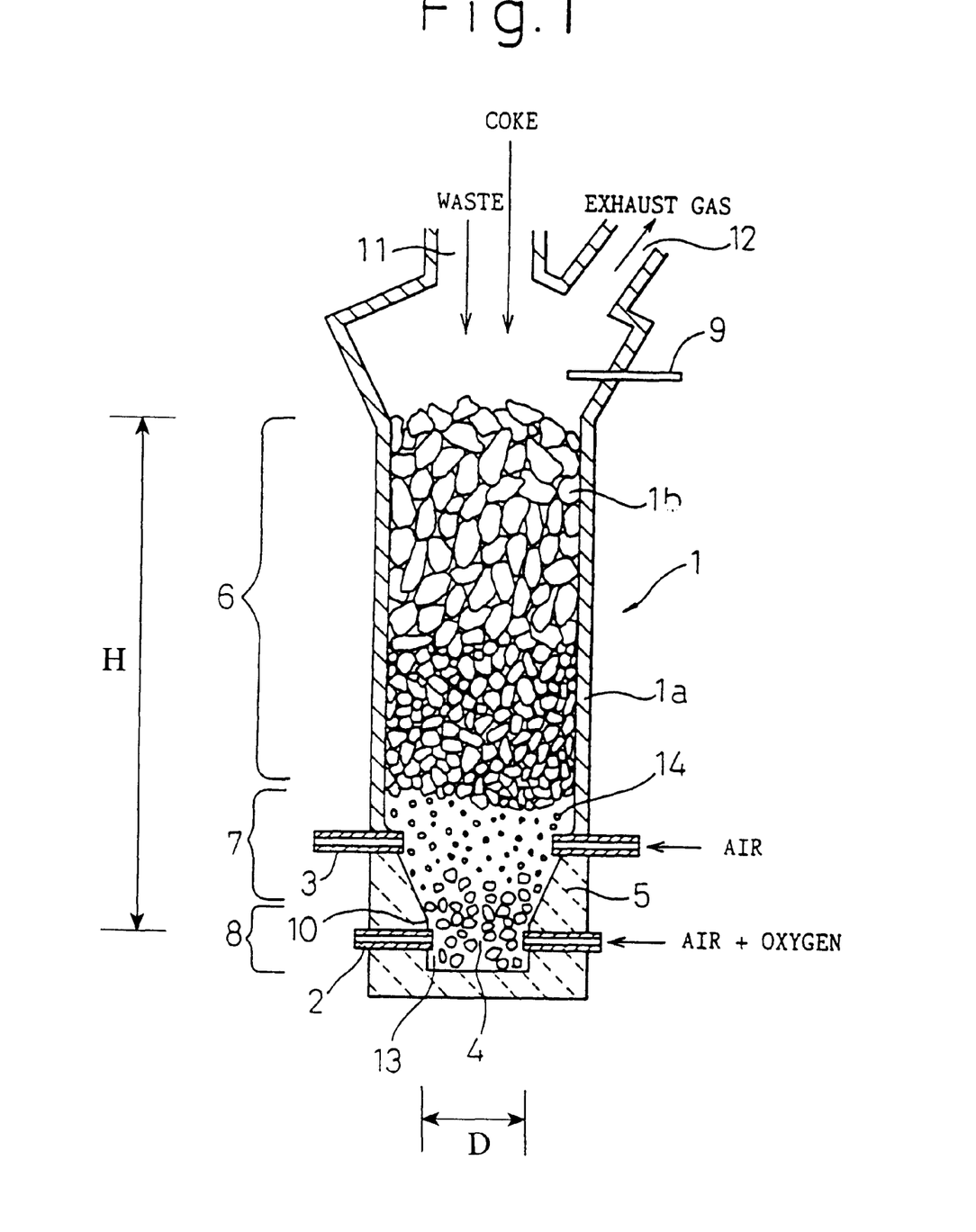
FIG. 1 is a schematic illustration showing an outline of the waste melting furnace according to the present invention.

Recently, there have been proposed a large number of systems in which waste produced in cities is disposed of by means of thermal decomposition. Further, there have been proposed a large number of shaft furnaces in which the residue of thermal decomposition is melted so as to decrease the volume of residue and further decrease the quantity of hazardous components. Japanese Examined Patent Publications (Kokoku) No. 46-34349 and No. 52-24790 propose the leading technology in this technique. Referring to FIG. 1, the melting type thermal decomposing waste disposal system disclosed by the above patent publications will be explained below. FIG. 1 is a view showing a reaction in the burning and melting furnace. Waste and coke are charged into the shaft section 1a from the input port (charging port) 11 arranged on the furnace top. While the thus charged waste and coke are forming charge layers (packing layers) in the furnace, they move down successively. While they are moving down, waste is successively melted by the action of reaction gas (thermally decomposed gas) that rises upward in the furnace. Exhaust gas produced in this treatment is transferred from the exhaust gas pipe (duct) 12, arranged adjacent to the charging port, to an exhaust gas treatment apparatus not shown in the drawing. In this exhaust gas treatment apparatus, heat in the exhaust gas is recovered and the exhaust gas is subjected to gas treatment. Specifically, trash that has been charged into the furnace from the input port 11 accumulates in the shaft section 1a. Water is removed from the waste in the uppermost section 6 of the shaft section 1a. The lower shaft section and the bosh section 5 compose a thermal decomposing zone 7. In the lower section of the thermal decomposing zone, there exists a large quantity of char which is made of carbide. Carbonic massive combustibles, which will be referred to as coke in this specification hereinafter, are burned by the action of a burning support gas that has been fed from tuyeres. This portion of the furnace in which the combustibles are burned is referred to as a burning and melting zone 8. Since the melted slag and iron are reserved in the basin 13, they are intermittently discharged from the slag discharge holes (not shown in the drawing), which are arranged close to the basin 13, when the slag discharge holes are opened by drills. After slag has been discharged from the furnace, the slag discharge holes are closed with mortar or the like. Reference numeral 10 is called a hearth section as a general term when it is compared with the reference numerals 5 and 1a. Exhaust gas produced in the process of burning and thermal decomposition is discharged from the duct 12.

After waste has been charged into the furnace, it is treated in the three steps of drying, thermal decomposition and burning melting. If the waste is not sufficiently dried, waste containing a large quantity of water enters the burning and melting zone. As a result, temperature in the burning and melting zone is remarkably lowered. Accordingly, it is necessary to simultaneously provide the following two functions. One is to provide a sufficiently large quantity of heat to dry the waste charged into the furnace, and the other is to provide a sufficiently large quantity of heat to melt the waste so as to occur the pyrogenetic reaction.

In this connection, an example of waste produced in a city contains combustibles 47.4%, garbage 26.6%, rubber and plastics 8.0%, and incombustibles 18.0% (wet base). In this case, the water content in waste is 40 to 60%. Accordingly, when the melting type thermal decomposing furnace is used, it is necessary to remove water from waste for the above reasons.

According to the technique disclosed in Japanese Examined Patent Publication (Kokoku) No. 60-11766 which is the prior art in this technical field, it is impossible to stably operate the burning and melting furnace in the case of a change in the composition of the usual waste, wide area disposal waste, reprocessing incineration residue from other incineration equipment, or mixing process with reclaimed waste, sludge or the like in the same furnace.

The reasons are as follows. When the ratio of either water or incombustibles is high, it is necessary to increase the quantity of coke which is an auxiliary fuel, and further it is necessary to increase a quantity of oxygen gas to be fed from the lower tuyeres in accordance with the increase in the quantity of coke. On the contrary, when a ratio of combustibles is high, in order to operate the furnace stably and effectively, it is necessary to decrease a quantity of coke and increase a quantity of waste to be burned by the upper tuyeres.

According to Japanese Examined Patent Publication (Kokoku) Nos. 63-3207 and 2-606, there has been disclosed a method in which a quantity of carbonic combustibles to be fed into the furnace and a quantity of gas containing oxygen to be fed onto the hearth of high temperature are controlled in order to maintain the oxygen concentration in an upper portion of the charged layer to be approximately zero and also maintain the exhaust gas temperature to be 700 to 1200° C. Also, there is disclosed a method in which a quantity of waste to be charged into the furnace is controlled in order to maintain the exhaust gas temperature in an upper portion of the charged layer to be 400 to 1200° C.

In the former case, in which the upper tuyeres are arranged, it is impossible to apply the method as it is. That is, it is impossible to operate the furnace stably only when a quantity of carbonic combustibles and a quantity of gas containing oxygen to be fed onto the hearth of high temperature are controlled. (According to the present invention, gas containing oxygen is fed onto the hearth of high temperature from the lower tuyeres.) The reason why it is impossible to attain a stable operation of the furnace is described as follows. When only the quantity of carbonic combustibles and the quantity of oxygen gas fed from the lower tuyeres are controlled, only the burning and melting condition is changed. Therefore, in the case of waste, the quantity of combustibles of which is large, it is impossible to maintain a quantity of waste to be burned by the upper tuyeres at an appropriate value. Accordingly, a stable operation can not be carried out.

In the latter case, in which the packed layers in the drying zone, the thermal decomposing zone and the burning and melting zone are formed and the upper tuyeres are arranged, it is impossible to apply the method as it is. The quantity of waste to be fed is determined by the operating speeds in the drying zone, the thermal decomposing zone and the burning and melting zone. Therefore, unless the quantity of waste burned by the upper tuyeres is properly controlled, it is impossible to adjust the temperature of exhaust gas.

DISCLOSURE OF INVENTION

According to the prior art, concerning waste which contains combustibles, the temperature of the incombustibles which move down to the zones of drying, thermal decomposition and burning melting, and also the temperature of residue of thermal decomposition are maintained sufficiently high, so that waste can be stably melted. However, the above stable melting can be attained only when the composition of waste to be disposed is changed in a normal changing range. In the case of wide area waste disposal of the latest problem, or process for incineration residue of other incineration equipment, reclaimed waste, sludge or the like in the same furnace, the composition of the waste to be disposed is changed greatly. Therefore, it is difficult to operate the furnace effectively and stably by the method of the prior art. It is an object of the present invention to realize a method of burning and melting waste by which coke and combustibles contained in the waste are most appropriately burned in the furnace even when the composition of waste is greatly changed as described above.

When the disposal of waste is conducted under the condition of the same thickness of the packed layer composed of charged materials, a quantity of exchanged heat is varied when the composition of waste is changed. Therefore, it becomes difficult to maintain the temperature of exhaust gas constant. Even in the above condition, when the thickness of the packed layer of charged materials is controlled, the most appropriate operation can be attained, and the stable operation can be conducted.

The present invention is provides a method of controlling a quantity of burning support gas blown into the waste melting furnace from a plurality of upper tuyeres, which are arranged on a plane direction of the waste melting furnace, so that the charged waste and combustibles can move down uniformly in the cross-sectional direction in the waste melting furnace, and the generation of cavities, which obstructs the charged waste and combustibles from coming down uniformly, can be prevented, and the failure of heat exchange caused by a blockage of local gas flow can be kept to the minimum. The summary of the present invention to accomplish the above objects will be described below.

The present invention is directed to a burning and melting method for a waste melting furnace. A furnace is provided having an upper portion, a drying zone positioned below the upper portion, a heat decomposing zone positioned below the drying zone, a burning and melting zone positioned below the heat decomposing zone, and a lower portion positioned below the burning and melting zone.

Waste material containing combustible waste substances and incombustible waste substances along with carbonic massive combustibles are fed into the upper portion of the furnace forming packed layers for passage through the furnace.

Lower stage tuyeres are provided in the burning and melting zone.

Lower stage burning support gas containing oxygen is fed into the burning and melting zone from the lower stage tuyeres for burning of the carbonic massive combustibles and melting of the incombustible waste substances by the burning of the carbonic massive combustibles. The burning of the carbonic massive combustibles and the melting of the incombustible waste substances create exhaust gas rising in the furnace toward said upper portion of the furnace.

The oxygen present in the lower stage burning support gas fed from said lower stage tuyeres is controlled to be more than or equal to 0.8 times the theoretical oxygen required for burning the carbonic massive combustibles.

Upper stage tuyeres are provided above the lower stage tuyeres. These upper stage tuyeres are located in the heat decomposing zone.

Upper stage burning support gas containing oxygen is fed into the heat decomposing zone from the upper stage tuyeres for heat decomposing the combustible waste substances. Heat decomposing of the combustible waste substances creates exhaust gas rising in the furnace toward the upper portion of the furnace.

The oxygen present in the upper stage burning support gas is present in a quantity such that a ratio of the quantity of oxygen present in the upper stage burning support gas to total quantity of oxygen present in both the upper stage burning support gas and the lower stage burning support gas is 0.2 to 0.8.

The total oxygen present in both the upper stage burning support gas feed by the upper stage tuyeres and the lower stage burning support gas feed by the lower stage tuyeres is 130 $Nm^3$ to 600 $Nm^3$ per one ton of waste material.

The packed layers of waste material and carbonic massive combustibles are dried in the drying zone by exhaust gas passing through the packed layers in the drying zone while maintaining temperature of the exhaust gas passing through the packed layers in the drying zone between 150° C. to 700° C.

The temperature of the exhaust gas passing through the packed layers in the drying zone is controlled by adjusting the thickness of the packed layers.

The quantity of the upper stage burning support gas feed from the upper stage tuyeres is controlled in response to temperature measured by a plurality of thermometers disposed throughout the furnace.

The oxygen concentration of the lower stage burning support gas is not less than 30% and oxygen concentration of said upper stage burning support gas is not greater than 21%.

The carbon content of the carbonic massive combustibles is not less than 30% and ash content of the carbonic massive combustibles is not greater than 70%, based upon dry weight of the carbonic massive combustibles.

The thickness of the packed layers satisfies the expression $H/D \geq 1$, where H is height of packed layers measure from the lower stage tuyeres to an upper end of the packed layers; and D is minimum inner diameter of the furnace located in the melting and burning zone.

BRIEF DESCRIPTION OF THE DRAWINGS

FIG. 2(*a*) is a longitudinal cross-sectional view for explaining the waste melting furnace of the third technical feature according to the present invention, and FIG. 2(*b*) is a transverse cross-sectional view.

BEST MODE FOR CARRYING OUT THE INVENTION

The present inventors made a large number of experiments on a waste melting furnace and obtained the following knowledge. The present invention has been accomplished as a result of this knowledge. First, it is necessary to melt slag in this shaft furnace in a temperature range from 1350 to 1550° C. It is preferable that slag is melted in this shaft furnace at the temperature range from 1400 to 1500° C. After slag has been heated to the above temperature range, it is discharged from the shaft furnace. When the temperature of slag is lower than 1350° C., iron contained in the waste is not melted. Therefore, iron contained in the waste accumulates in the shaft furnace so that the function of the shaft furnace is deteriorated. On the other hand, slag heated to high temperatures remarkably damages refractories in the furnace. In this way, when slag is heated to excessively high temperatures, problems may be caused. For the above reasons, the most appropriate operation temperature of the shaft furnace is determined so that the temperature of slag to be discharged from the furnace can be in the temperature range from 1400 to 1500° C.

Secondly, the aforementioned high temperatures can not be achieved only by burning combustible substance contained in waste. As described before, waste contains a considerable quantity of combustible substance, and its low calorific value is approximately 1000 to 3000 kcal/kg. However, in order to burn the combustible substance contained in waste at high temperatures, it is necessary to feed a gas which contains oxygen in a high concentration. In the present invention, in order to decrease a quantity of oxygen of high concentration used for burning the combustible substance in waste, coke is used which can be burned at high temperatures.

Common waste produced in city areas was disposed in a shaft furnace having a single stage of tuyeres. As a result of the experiment, operation of the shaft furnace was stabilized at the above slag temperatures under the following operating conditions. Fifty to 150 kg of coke was added to one ton of waste, and air used for burning was enriched with oxygen so that a ratio of oxygen to air used for burning could be 25 to 40%. Air enriched with oxygen gas in the above manner was blown into the furnace from the tuyeres. Under the above operating conditions, operation of the furnace was stabilized at the aforementioned temperatures. In this case, in order to make the ratio of oxygen to air to be about 32% as an average condition, 110 Nm$^3$ of pure oxygen was fed to one ton of waste, and also 100 kg of coke was fed to one ton of waste.

In order to decrease quantities of these auxiliary materials as small as possible, the present invention adopts a furnace having two stages of tuyeres. New tuyeres 3 are arranged above the lower stage tuyeres 2 as shown in FIG. 1. Therefore, a quantity of air fed to the furnace was divided into two portions, wherein one portion of air was fed to the upper stage tuyeres and the other portion of air was fed to the lower stage tuyeres. Air to be fed to the upper stage tuyeres was not preheated, and air to be fed to the lower stage tuyeres was enriched with oxygen so that the oxygen concentration was 30 to 40%. When air enriched with oxygen in the above manner was blown into the furnace from the tuyeres, a quantity of coke to be used in the furnace was decreased to 20 to 100 kg per one ton of waste. For example, when the ratio of oxygen in the lower stage tuyeres was 28% in the average operating condition, the quantity of pure oxygen may be 24 Nm$^3$ per one ton of waste, and a quantity of coke may be 20 kg per one ton of waste.

As a result of the above experiment, it was found that a quantity of auxiliary material such as oxygen could be greatly decreased when the melting furnace was improved a little.

Therefore, the inventors made an experiment to find the most appropriate profile of the shaft furnace. When the feed of burning support gas from the tuyeres was stopped during the operation of the furnace and nitrogen gas was fed instead of burning support gas, reaction in the furnace was stopped and the furnace was maintained in the stopped condition. When investigation was made in the above manner, water was removed from waste in the upper section of the furnace as shown in FIG. 1, and waste was dried. Successively, waste was thermally decomposed immediately before the bosh section in the furnace. Therefore, fine particles of carbide exist in the bosh section. In view of the above circumstances, it is necessary that pieces of waste, the profiles of which are not changed, are supported in an upper portion of the bosh section. For the above reasons, it is necessary to arrange the bosh section in the furnace, and further it is necessary that the upper stage tuyeres are arranged in the bosh section for the purpose of burning fine particles of carbide in this portion of the furnace. The lower stage tuyeres are arranged in the hearth section of the furnace, and burning support gas is fed from these lower stage tuyeres, so that coke in the furnace and carbon (char) generated from solid waste are burned by the action of burning support gas. Usually, coke stays in a portion close to the lower stage tuyeres, and coke accumulates in a portion of the furnace, the height of which is 300 to 500 mm from the lower tuyeres. This portion is referred to as a coke bed. As described later, the method of the present invention is characterized in that: incombustible material contained in waste is melted at high temperatures in a lower portion of the furnace, and waste is dried by a large quantity of gas of low temperatures in an upper portion of the furnace. For the above reasons, it is preferable that air is fed into the coke bed and a volume of combustion gas is increased so that gas of a very high temperature can be diluted. From the above viewpoint, the upper stage tuyeres 3 are arranged at positions higher than the lower stage tuyeres by 300 mm. When a distance from the lower stage tuyere to the upper stage tuyere is too long, the temperature of gas in the lower portion of the furnace is excessively cooled. Accordingly, there is a possibility that gas cannot be reignited at the upper stage tuyeres 3. Consequently, it is necessary that the upper stage tuyeres 3 are arranged in a region in which the thermal influence of the lower stage tuyeres 2 still remains.

In the case of a large-scale furnace, the distance from the lower stage tuyeres to the upper stage tuyeres is extended. In this case, no problems are caused when a plurality of upper stages of tuyeres are arranged in the perpendicular direction.

As described above, it is necessary that the temperature of slag discharged from the furnace is maintained in the temperature range from 1350 to 1550° C., and it is preferable that the temperature of slag discharged from the furnace is maintained in the temperature range from 1400 to 1500° C. When it was decomposed in the furnace with only lower staged tuyeres, the incombustible material contained in waste is melted when coke is burned at high temperature in a portion close to the lower tuyeres. Successively, waste is thermally decomposed and dried by this combustion gas at a high temperature. Accordingly, when the composition of waste is changed and a quantity of water contained in the waste is increased, that is, when drying operation to be performed by the combustion gas must be strengthened, or when a quantity of material to be melted is large, that is, when waste must be heated to a high temperature so that it can be melted, the arrangement of this furnace, in which only one stage of lower tuyeres are arranged, is not appropriate.

When the two stages of upper and lower tuyeres are arranged in the furnace according to the present invention, the above problems can be solved and, at the same time, quantities of auxiliary materials such as coke and oxygen can be decreased. The lower stage tuyeres 2 are arranged for the purpose of raising the temperature of waste. Therefore, the conditions are set so that the temperature of waste can be raised as high as possible. In order to obtain the slag temperature described above, it was necessary to use combustion air enriched with oxygen, the ratio of which was not lower than 30%. An upper limit of the concentration of oxygen is not particularly stipulated, however, in order to reduce the quantities of coke and pure oxygen gas, which are auxiliary materials, and further in order to suppress the damage of the furnace wall caused by a locally abnormal high temperature, the upper limit of the concentration of oxygen may be determined to be about 40%. It is unnecessary for the upper stage tuyeres to obtain high temperatures. Therefore, the concentration of oxygen is determined to be not higher than 21% at which combustion air is not enriched with oxygen, and the combustion temperature can be suppressed in the following manner. Preheated air or unpreheated air is used, or in order to suppress the generation of clinker caused by high temperatures in a portion close to the upper stage tuyeres, steam or inert gas such as nitrogen gas is mixed into air, or alternatively gas of low oxygen concentration such as is mixed into air, or exhaust gas only is used so as to suppress the combustion temperature.

Theoretically, when two stages of tuyeres are arranged in the furnace and gas generated in the lower stage is burned in the coke bed, carbon is effectively burned. Therefore, the total quantity of oxygen fed from air and pure oxygen is increased to more than the total quantity of oxygen in the case of one stage tuyeres. However, as a result of the experiment made by the inventors, when the same quantity of coke was used, the total quantity of oxygen was approximately the same. However, the quantity of coke used for the furnace was decreased by the effect of the two stages of tuyeres. Due to the foregoing, the total quantity of oxygen was decreased.

Concerning coke which is an auxiliary material, it is necessary to use coke, the quantity of which is 20 to 100 kg per one ton of waste, when usual solid waste is disposed, especially when common waste generated in Japan is disposed. In the case of common waste, the water content of which is 40 to 60%, it is necessary to burn coke at 30 to 80 kg per one ton of waste. In the case of waste, the water content of which is high, or the incombustible content of which is high, the quantity of coke to be burned is increased.

In the case where the composition of waste is greatly changed, operation can be stably and effectively conducted when the following operating conditions are adopted.

A quantity of oxygen required for disposing of one ton of waste is changed in accordance with a quantity of required coke, however, when the quantity of oxygen is not larger than 130 $Nm^3$, coke and the combustible material contained in waste are not completely burned in the furnace. Therefore, a quantity of heat necessary for drying, thermally decomposing and melting can not be ensured. As a result, it becomes difficult for the melted material to be discharged from the furnace, and operation of the furnace becomes impossible. When the quantity of oxygen is not smaller than 600 $Nm^3$, coke and the combustible substance contained in waste are excessively burned in the furnace, so that the temperature of exhaust gas is raised high. Accordingly, it is impossible to conduct an effective operation of the furnace. When a quantity of oxygen of lower stage burning support gas fed from the lower stage tuyeres is 0.8 time as large as the theoretical burning oxygen quantity, coke can be completely burned and a loss caused by the endothermic chemical reaction can be suppressed. Accordingly, it is possible to ensure a heat source for melting and drying while coke is being burned most effectively. Therefore, it is possible to maintain the temperature of exhaust gas high.

The upper stage burning support gas is fed from the upper stage tuyeres so that a ratio of the quantity of oxygen contained in the upper stage burning support gas, to the total quantity of oxygen contained in the upper and the lower stage burning support gas can be 0.2 to 0.8. When this ratio is not higher than 0.2, thermally decomposed powder-like carbide contained in waste can not be completely burned. When this ratio is not lower than 0.8, an excessively large quantity of oxygen is fed to thermally decomposed powder-like carbide contained in waste. Therefore, it becomes impossible to maintain a reducing burning condition locally, and a quantity of heat contained in exhaust gas is lowered. In this case, even if a secondary combustion chamber is arranged in the rear stage so as to conduct combustion completely, it is incapable of conducting to self-sustained combustion.

Temperature on the packed layers is stipulated to be in the range from 150 to 700° C. However, in order to operate the furnace more stably and effectively, it is preferable that the temperature on the charged waste layer is maintained in the range from 200 to 300° C. When the exhaust gas temperature is lower than 150° C., in the case of waste, the water content of which is large, and in the case of waste such as plastics, the tar generating ratio of which is high, the temperature of exhaust gas is lowered, and the temperature of waste is gradually raised. As a result, thermal decomposition is conducted at low temperatures, and a ratio of tar generated by the thermal decomposition at low temperatures is increased. Due to the foregoing, a quantity of tar contained in exhaust gas is increased. Accordingly, when tar generated in the thermal decomposing zone passes through a drying zone located in the upper portion of the packed layers, a quantity of condensation of tar is increased. As a result, gas permeability in the drying zone is deteriorated, and finally it becomes difficult to continue operation of the furnace.

On the other hand, when the temperature of exhaust gas is higher than 700° C., especially when waste, the ratio of combustible substance of which is low, is disposed, a ratio of thermally decomposed gas is increased. Therefore, a quantity of thermally decomposed residue, which is combustible, remaining in the furnace is decreased, so that a quantity of combustion of the combustible material contained in waste is decreased in the furnace. As a result, a capacity of the heat source to be used for drying becomes insufficient, and it becomes necessary to increase a quantity of coke that is used. Therefore, this furnace operation is not economical. When the temperature of exhaust gas exceeds 700° C., chlorine neutralized in exhaust gas is changed into hydrogen chloride gas by the chemical reaction represented by the formula of $CaCl_2 + H_2O \rightarrow CaO + 2HCl$. Since hydrogen chloride gas is generated as described above, the top of the furnace and the exhaust gas duct is corroded. In order to prevent the corrosion, it is necessary to design the furnace with a corrosion resistance, which leads to an increase in the equipment cost. Further, chemical compounds of low melting points contained in exhaust gas adhere to the top of the furnace and the exhaust gas duct. Therefore, it is difficult to operate the furnace over a long period of time.

Since the exhaust gas temperature results in a change in the composition of waste, it is used as an important index of when quantities of coke to be fed and when upper stage oxygen and lower stage oxygen are adjusted. That is, when the exhaust gas temperature is lowered, the water content or the ash content in waste is high. Accordingly, in order to make up for the heat sources for drying and melting, a quantity of coke to be fed is increased, and a ratio of oxygen in the lower stage tuyeres is increased in accordance with that. On the contrary, when the temperature of exhaust gas is raised, the ratio of combustible material in waste is high. Accordingly, a quantity of coke to be fed is decreased, and a ratio of oxygen of the lower stage tuyeres is decreased in accordance with that, and a ratio of oxygen of the upper stage tuyeres is increased. Due to the foregoing, a quantity of combustion of the thermally decomposed residue of the combustible material is increased, so that the heat source for drying can be ensured and the temperature of incombustible material can be raised. As a result, it becomes possible to further decrease the quantity of coke to be fed by synergetic effect. That is, according to the relation described before, a ratio of feeding coke (kg/ton of waste) is adjusted so that it can satisfy the following expression, and further a ratio of a quantity of oxygen of the upper stage tuyeres is adjusted in the range from 0.2 to 0.8, and furthermore a quantity of oxygen necessary for disposing one ton of waste is adjusted. In this way, the temperature of exhaust gas is controlled.

The following equation is useful in the practice of the present invention:

(ratio of coke to be fed)≦{1−(ratio of quantity of oxygen of upper stage tuyeres)}×(quantity of oxygen necessary for disposing one ton of waste)/(theoretical quantity of oxygen for burning coke of one kg)×0.8.

The above ratio of coke to be fed and the ratio of the quantity of oxygen of the lower stage tuyeres may be manually or automatically controlled, that is, the controlling method is not particularly restricted.

In the second invention of the present invention, when the composition of waste is changed, even if the ratios of combustible material, water and incombustible substance are the same, the shapes of pieces of waste are changed in some cases. This is a case in which the following two shapes of waste are disposed. The size of one shape is large and the specific surface area is small, and the size of the other shape is small and the specific surface area is large. In the above case, when waste is disposed with the same thickness of the charged material layer, even if the temperature of exhaust gas can be maintained at an appropriate value in the case of large shape and small specific surface area, a quantity of exchanged heat on the charged material layer is excessively increased in the case of small shape and large specific surface area. Accordingly, it becomes impossible to maintain the temperature of exhaust gas at an appropriate value which is not lower than 150° C. In order to solve the above problems, it is possible to adopt a method of adjusting a quantity of oxygen, a rate of feeding coke and a ratio of the quantity of lower stage oxygen. Except for the above method, it is possible to adopt a method of changing a volume of the charged material layer so that a difference between the specific surface areas can be canceled without changing the above conditions. Since the cross-sectional area of the furnace is constant in this case, an operation can be stably executed when the thickness of the charged material layer stipulated in the second invention is adjusted.

It is necessary for the thickness of the charged material layer to satisfy the inequality of H/D≧1. When the above condition is not satisfied, a flow of gas in the charged material layer tends to deviate. Therefore, the heat exchange efficiency of the charged material layer fluctuates, and operation becomes unstable.

Referring to examples, the present invention will be explained in detail below.

EXAMPLES

Example 1

This is an example in which a waste melting furnace having two stages of tuyeres was operated to dispose common waste. The waste melting furnace shown in FIG. 1 was used in this example. Gas for burning and melting waste was fed from the upper and the lower stage tuyeres to melt common waste.

The distance between the upper stage tuyeres and the lower stage tuyeres was 500 mm, and the number of the upper stage tuyeres was 8 and the number of the lower stage tuyeres was 4.

The composition of waste disposed in this example is described as follows.

Water: 42.4%

Ash: 15.0%

Combustible substance: 42.6%

Lower calorific value: 1720 kcal/kg

The operating conditions were adjusted so that the temperature of exhaust gas at the furnace top would be an appropriate value. The operating conditions are described as follows. When waste was charged into the waste melting furnace, coke of 30 kg and lime stone of 20 kg were added to waste of one ton. Air at normal temperature was blown into the furnace from the lower stage tuyeres, the volume of which was 120 $Nm^3$, to which pure oxygen gas at normal temperature, the volume of which was 33 $Nm^3$, was added, that is, a burning support gas enriched by 38% in total was blown into the furnace. Air at normal temperature, the volume of which was 495 $Nm^3$, was blown into the furnace from the upper stage tuyeres. A ratio of the volume of oxygen blown from the upper stage tuyeres into the furnace, to the total volume of oxygen was 0.6. A volume of oxygen blown from the lower stage tuyeres into the furnace was 1.3 times as large as the theoretical volume of oxygen required for burning. A total volume of oxygen per one ton of waste was 162 $Nm^3$. In this waste melting furnace, waste was disposed of at a ratio of 3.0 t/h.

As a result, slag of 109 kg and metal of 47 kg per one ton of waste were melted in the furnace and discharged from the slag discharge hole. At this time, the temperature of slag was 1480° C. Exhaust gas containing $N_2$: 58.6%, $CO_2$: 15.9%, CO: 14.6%, $H_2$: 9.4% and $CH_4$: 1.5%, the temperature of which was 350° C., was generated at the furnace top. In this case, a volume of thus generated exhaust gas was 1420 $Nm^3$ per one ton of waste.

Thus generated exhaust gas was burned by a combustion apparatus connected to the waste melting furnace, and heat was exchanged in a boiler and a heat exchanger so that heat in the combustion gas was recovered.

In this connection, the inventors made experiments in which the interval between the upper and the lower stage tuyeres was set at 1500 and 2000 mm. As a result of the experiments, it was confirmed that waste could be disposed without changing the above operating conditions.

Example 2

This is an example in which a waste melting furnace having one stage of tuyeres was operated to dispose of common waste. The waste melting furnace shown in FIG. 1 was used in this example. Gas for burning and melting waste was fed only from the lower stage tuyeres to melt common waste, that is, the upper stage tuyeres were not used in this example.

The number of lower stage tuyeres was 4.

The composition of waste disposed in this example is described as follows.

Water: 42.4%

Ash: 15.0%

Combustible substance: 42.6%

Lower calorific value: 1720 kcal/kg

The operating conditions are described as follows. When waste was charged into the waste melting furnace, coke of 60 kg and lime stone of 20 kg were added to one ton waste. Air at normal temperature was blown into the furnace from the lower stage tuyeres, the volume of which was 334 $Nm^3$, to which pure oxygen at normal temperature, the volume of which was 92 $Nm^3$, was added, that is, the burning support gas enriched by 38% in total was blown into the furnace. A volume of oxygen blown from the lower stage tuyeres into the furnace was 1.7 times as large as the theoretical volume of oxygen required for burning. A total volume of oxygen per one ton of waste was 162 $Nm^3$.

As a result, slag of 109 kg and metal of 47 kg per waste of one ton of waste were melted in the furnace and discharged from the slag discharge hole. At this time, the temperature of slag was 1490° C. Exhaust gas containing $N_2$: 42.5%, $CO_2$: 19.0%, CO: 24.0%, $H_2$: 12.5% and $CH_4$: 2.0%, the temperature of which was 340° C., was generated from the furnace top. In this case, a volume of thus generated exhaust gas was 1210 $Nm^3$ per one ton of waste.

Thus generated exhaust gas was burned by a combustion apparatus connected to the waste melting furnace, and heat was exchanged in a boiler and a heat exchanger so that heat in the combustion gas was recovered.

Combustible substance: 28.4%

Lower calorific value: 950 kcal/kg

The operating conditions were adjusted so that the temperature of the exhaust gas at the furnace top could be an appropriate value. The operating conditions are described as follows. When waste was charged into the waste melting furnace, coke of 60 kg and lime stone of 20 kg were added to one ton of waste. Air at normal temperature was blown into the furnace from the lower stage tuyeres, the volume of which was 185 $Nm^3$, to which pure oxygen at normal temperature, the volume of which was 50 $Nm^3$, was added, that is, burning support gas enriched by 38% in total was blown into the furnace. Air at normal temperature, the volume of which was 340 $Nm^3$, was blown into the furnace from the upper stage tuyeres. A ratio of the volume of oxygen blown from the upper stage tuyeres into the furnace, to the total volume of oxygen was 0.4. A volume of oxygen blown from the lower stage tuyeres into the furnace was 0.9 time as large as the theoretical volume of oxygen required for burning. A total volume of oxygen per one ton of waste was 159 $Nm^3$. In this waste melting furnace, waste was disposed by a ratio of 3.0 t/h.

As a result, slag of 76 kg and metal of 33 kg per waste of one ton were melted in the furnace and discharged outside from the slag discharge hole. At this time, the temperature of slag was 1480° C. Exhaust gas containing $N_2$: 57.6%, $CO_2$: 17.0%, CO: 17.0%, $H_2$: 7.3% and $CH_4$: 1.2%, the temperature of which was 230° C., was generated at the furnace top. In this case, the volume of the generated exhaust gas was 1520 $Nm^3$ per one ton of waste.

The generated exhaust gas was burned by a combustion apparatus connected to the waste melting furnace, and heat was exchanged in a boiler and a heat exchanger so that heat in the combustion gas was recovered.

The results of the above examples are shown on Table 1.

TABLE 1

| Example No. | Number of tuyere stages | Water contained in waste % | Volume of pure oxygen (Upper stage + Lower stage) $Nm^3$/ton of waste | Air $Nm^3$/ton of waste | Pure oxygen $Nm^3$/ton of waste | Coke kg/ton of waste | Exhaust gas temperature ° C. | Ratio of volume of oxygen fed from upper tuyeres | Ratio of volume of oxygen fed from lower stage tuyeres, to theoretical volume of oxygen required for burning |
|---|---|---|---|---|---|---|---|---|---|
| 1 | Two stages | 42.4 | 162 | 615 | 33 | 30 | 350 | 0.6 | 1.3 |
| 2 | One stage | 42.4 | 162 | 334 | 92 | 60 | 340 | 0 | 1.7 |
| 3 | Two stages | 61.6 | 159 | 525 | 50 | 60 | 230 | 0.4 | 0.9 |

Example 3

This is an example in which a waste melting furnace having two stages of tuyeres was operated to dispose of common waste and waste containing a large quantity of water such as sludge. The waste melting furnace shown in FIG. 1 was used in this example. Gas for burning and melting waste was fed from the upper and the lower stage tuyeres to melt the mixed waste described above.

The distance between the upper stage tuyeres and the lower stage tuyeres was 500 mm, and the number of the upper stage tuyeres was 8 and the number of the lower stage tuyeres was 4.

The composition of waste disposed in this example is described as follows.

Water: 61.6%

Ash: 10.0%

As can be seen on the Table 1, both the consumption unit of coke and that of pure oxygen are decreased in the case of two stage tuyeres compared with the case of one stage tuyeres. In the case of waste, the water content of which is high, in order to maintain the temperature of exhaust gas at an appropriate value, it is necessary to change the conditions of coke, pure oxygen and others. When the present invention is practiced, the following advantages result. Even when the composition of waste is greatly changed, it is possible to utilize heat energy, which has been uneconomically emitted into exhaust gas, for the reaction conducted in the furnace, so that the quantities of various auxiliary materials to be used can be decreased and the occurrence of operational problems can be prevented. Therefore, it becomes possible to conduct operation stably. That is, in order to effectively utilize the auxiliary materials such as coke and pure oxygen in accordance with the composition of waste and operate the furnace without causing any problem, burning support gas containing oxygen of 130 to 600 $Nm^3$ per one ton of waste is fed to the furnace, and burning support gas is fed from the upper stage tuyeres so that a volume of oxygen fed from the upper stage tuyeres can be 0.2 to 0.8 time as large as the total of volume of oxygen. Also, the following can be understood. A concentration of oxygen contained in burning support gas fed from the lower stage tuyeres is maintained to be not lower than 30%, and a quantity of coke to be fed is adjusted so that a volume of oxygen fed from the lower stage tuyeres can be a value not lower than 0.8 times the theoretical volume of oxygen required for burning coke, and the temperature of exhaust gas on the charged waste layer is maintained at 150 to 700° C.

In the present invention, thickness of the charged waste layer is measured by a weight type or ultrasonic type measuring device in such a manner that an upper end level of the charged waste layer is detected by the measuring device. When thickness of the charged waste layer is changed, the upper end level of the packed layers is made to rise and fall.

In order to make the thickness of the packed layers decrease, the feeding of waste, which is continuously or substantially continuously conducted until that time, is temporarily stopped, and when the upper end level of the packed layers reaches a predetermined level, the feeding of waste is resumed. To make the thickness of the packed layers increase, the operation is conducted opposite to the above.

When waste is disposed in the third example according to the following conditions, it is impossible to maintain the temperature of exhaust gas at 150° C. The conditions are: (height of the packed layers)/(inner diameter of furnace bottom)=2.0; height of the packed layers is 4 m; and waste is subjected to crushing treatment, so that the specific surface area is large.

Therefore, only when the height of the packed layers was decreased to 3 m by the changing operation of the layers thickness described before, was it possible to maintain the temperature of exhaust gas at a value higher than 200° C. without changing the conditions of a volume of oxygen, the quantity of coke to be fed and the ratio of lower stage oxygen. At this time, (height of the packed layers)/(inner diameter of furnace bottom)=1.5, that is, the value of (height of the packed layers)/(inner diameter of furnace bottom) was maintained to be not lower than 1.0. Accordingly, a flow of exhaust gas was not biased in the furnace, and operation was stably carried out.

Example 4

Figure 2A:
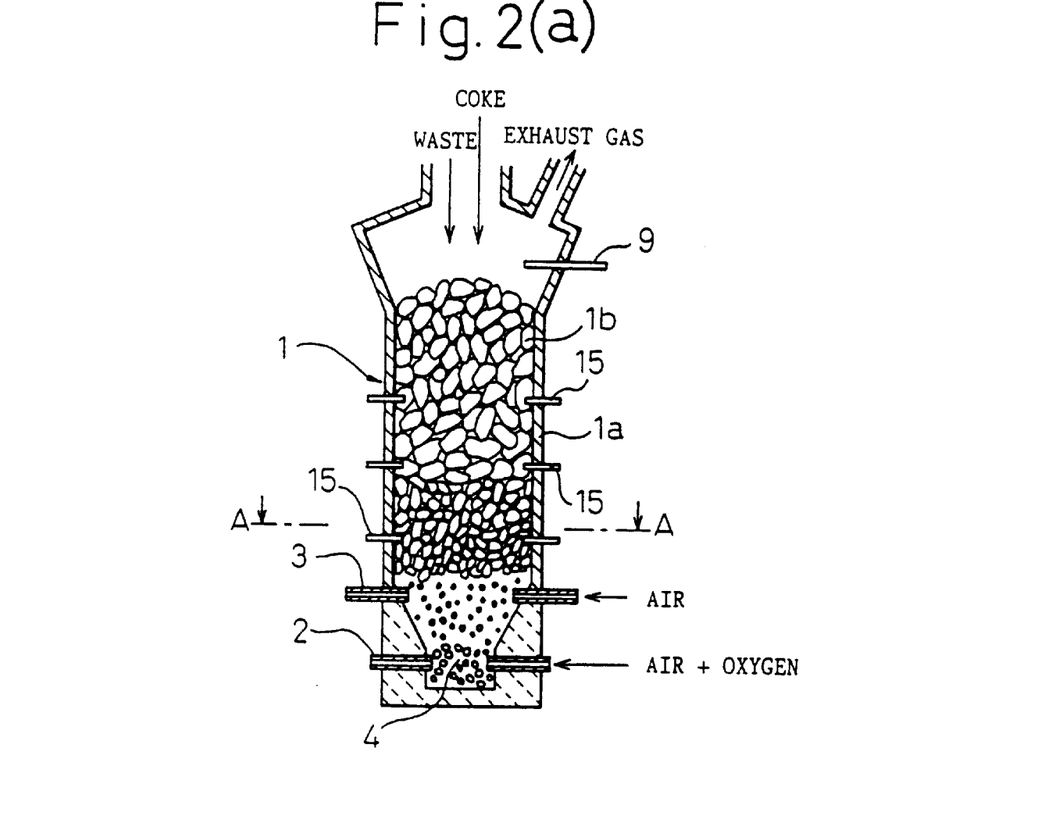
Figure 2B:
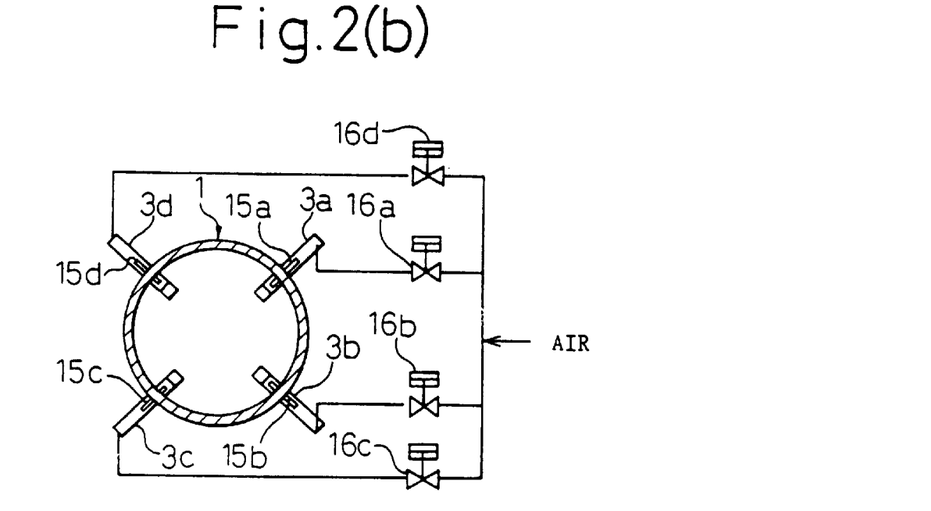

Next, an example of the third invention of the present invention will be explained below. FIGS. 2(a) and 2(b) are schematic illustrations of the waste melting furnace of this example. FIG. 2(a) is a longitudinal cross-sectional view of the waste melting furnace, and FIG. 2(b) is a transverse cross-sectional view.

The structure of the waste melting furnace is the same as that of the conventional melting furnace described before. At each upper stage tuyere 3, there is provided a shutoff valve 16 to control the volume of burning support gas of the upper stage tuyere.

In the present invention, in order to detect that the charged materials 1b have come down in the cross-sectional direction and also in order to detect of the formation of cavities, there are provided a plurality of thermometers 15 arranged in the cross-sectional direction of the shaft section 1a at regular intervals, and there are provided a plurality of stages of thermometers 15 in the perpendicular direction of the furnace. Temperatures of gas and solid bodies in the melting furnace are measured by these thermometers. The thermometers 15 are arranged at positions above the upper stage tuyeres 3 in such a manner that the thermometers 15 are aligned with the upper stage tuyeres 3.

In the above structure, when the charged materials 1b are stably coming down, the thermometers measure the temperatures of solid bodies. Accordingly, the thermometers indicate relatively low temperatures. On the other hand, when the charged materials 1b are not stably coming down and cavities are being formed in the furnace, or when a locally concentrated flow of gas has been generated in the furnace, heat can not be sufficiently exchanged between the solid bodies and gas in the furnace. Accordingly, the thermometers indicate relatively high temperatures.

Figure 3:
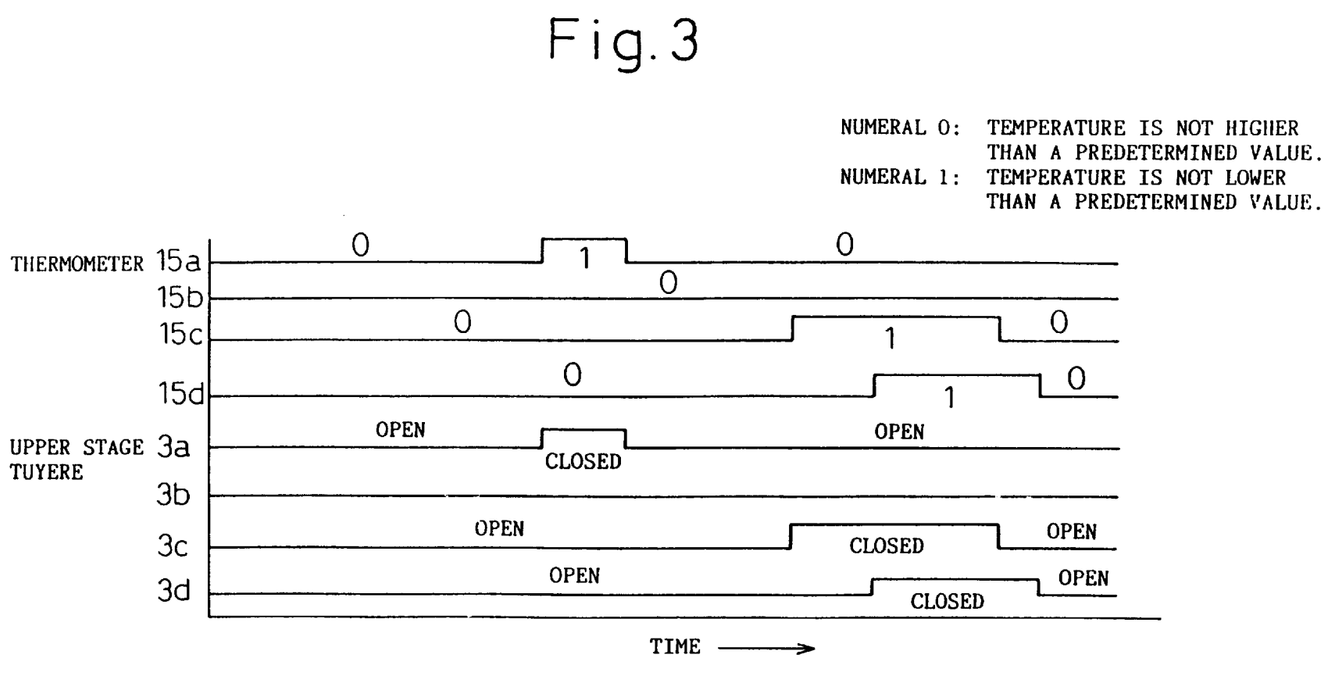
FIG. 3 is a time chart of an example of the third technical feature according to the present invention.

FIG. 3 is a time chart of this example.

When thermometers 15a to 15d arranged in a certain stage indicate values not higher than a predetermined value in FIG. 3, that is, when thermometers 15a to 15d arranged in a certain stage indicate zero in FIG. 3, the thermometers 15a to 15d are measuring the temperatures of solid bodies. Accordingly, solid bodies are present in these portions in the furnace, that is, the charged materials are stably coming down in the furnace. Therefore, the shutoff valves 16a to 16d are kept open, and a predetermined volume of upper stage burning support gas is blown into the furnace.

On the other hand, for example, when the thermometer 15a indicates a value exceeding a predetermined value as shown by the reference numeral 1 of the thermometer 15a in FIG. 3, heat is not sufficiently exchanged between the solid bodies and gas in the furnace. That is, the charged materials are not stably coming down. Therefore, a volume of burning support gas of the upper stage tuyere 3a is decreased by the shutoff valve 16a, and volumes of burning support gas of the upper stage tuyeres 3b, 3c, 3d are increased. After that, when the thermometer 15a indicates a value lower than the predetermined value, the shutoff valve 16a is opened, so that the volume of burning support gas in the upper stage is returned to the initial value.

When the volume of burning support gas in the upper stage blown into the furnace is controlled as described above, it is possible for the charged materials to come down stably, and heat exchange can be sufficiently conducted between gas and the charged materials. In a portion where the charged materials are not stably coming down, a large quantity of heat accumulates. Therefore, when a volume of burning support gas in the upper stage is decreased, a quantity of generated heat is decreased, so that the furnace can be thermally balanced.

Figure 4:
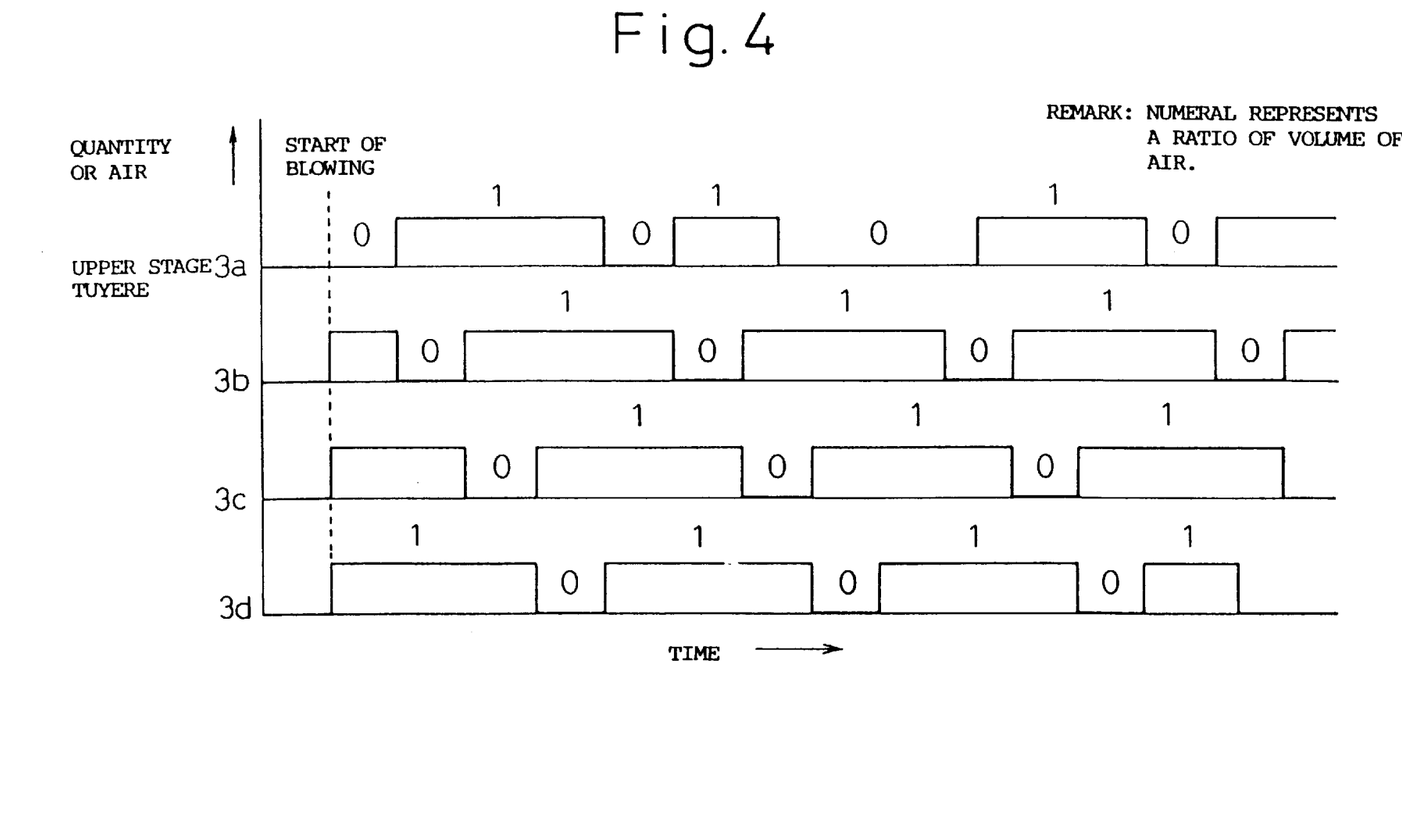
FIG. 4 is a time chart of another example of the third technical feature according to the present invention.

FIG. 4 is a time chart of another example of the present invention.

In FIG. 4, a method of operation is shown in which a volume of burning support gas of the upper stage blown out from each tuyere of the upper stage is periodically increased and decreased for the purpose of stabilization of furnace operation by making the charged materials come down uniformly in the furnace. At the start of blowing gas, upper stage burning support gas is not blown from the upper stage tuyere 3a, but the same volume of upper stage burning support gas is blown into the furnace from each of the remaining upper stage tuyere 3b, 3c, 3d. Then, after a predetermined period of time has passed, usually, after 10 minutes have passed, blowing of upper stage burning support gas from the upper stage tuyere 3b is stopped, and at the same time, blowing of upper stage burning support gas from the upper stage tuyere 3a is started. Further, after a predetermined period of time has passed, blowing of upper stage burning support gas from the upper stage tuyere 3c is stopped, and at the same time, blowing of upper stage support gas from the upper stage tuyere 3b is resumed. Further, after a predetermined period of time has passed, blowing of upper stage burning support gas from the upper stage tuyere 3d is stopped, and at the same time, blowing of upper stage support gas from the upper stage tuyere 3c is resumed. The above operations are periodically conducted. In spite of stoppage of blowing gas from each upper stage tuyere 3a to 3d, a total volume of gas blown out from the upper stage tuyeres per unit time can be maintained constant.

For example, in the case of a waste melting furnace, the throughput of which was 20 ton/day, the number of tuyere stages of which was 2, and the number of tuyeres of which was 4 piece/stage, a total volume of 400 Nm$^3$/hour of upper stage burning support gas was blown into the waste melting furnace successively from the upper stage tuyeres 3a to 3d for 10 minutes, and after that burning support gas was stopped. The above pattern was repeated several times. As a result of the above operation of the melting furnace, waste, the composition of which was relatively uniform, was effectively disposed of.

However, in the case of disposing waste, the composition of which was remarkably non-uniform, the charged materials did not come down uniformly, so that the indication of the thermometer exceeded a predetermined value. Accordingly, operation of the melting furnace was conducted as follows so as to operate the furnace stably. The volume of upper stage burning support gas of the upper stage tuyere 3a was decreased by the shutoff valve 16a. After that, when the indication of the thermometer 15a was changed to a value lower than the predetermined value, the volume of upper stage burning support gas was adjusted by the shutoff valve 16a in accordance with the above pattern. In this way, the waste melting furnace was operated stably. With regard to the upper stage tuyere 3d, operation was conducted in the same manner, that is, when the indication of the thermometer 15d was changed to a value higher than the predetermined value, the volume of upper stage burning support gas of the upper stage tuyere 3d was decreased by the shutoff valve 16d.

When cavities are generated in the melting furnace, reduction of a period of time necessary for filling the cavities with charged materials can be more effectively attained by decreasing the volume of upper stage burning support gas so as to decrease a buoyancy given to the charged materials, than by increasing the volume of upper stage burning support gas so as to increase the treatment speed of the charged materials.

INDUSTRIAL APPLICABILITY

When the present invention is applied to the waste melting furnace, heat energy, which has been uneconomically emitted into exhaust gas in the case of a melting furnace of the prior art, can be effectively utilized for the reaction conducted in the furnace. Therefore, it is possible to decrease quantities of various auxiliary materials. Further, charged materials can be uniformly made to come down in the melting furnace. Even when cavities are generated in the furnace, it is possible to stop the charged materials from not uniformly coming down in the furnace, and further it is possible to stop a failure of heat exchange between the charged materials and a gas which is caused by a local concentrated of the gas flow in the furnace.

Even when heat exchange can not be sufficiently conducted due to the generated cavities, it is possible to suppress the generation of heat by decreasing the volume of upper stage burning support gas. Therefore, the temperature of the gas can be decreased. Accordingly, refractories on the furnace wall can be prevented from being locally heated, and life of the apparatus can be extended.

According to the present invention, even when a gas flow is concentrated in the furnace and a quantity of heat exchanged between waste and gas is lowered, it is possible for the furnace to quickly recover from the above undesirable condition, and the treatment speed of waste can be increased, on average. Further, it is possible to minimize the cross-sectional area of the waste melting furnace. Therefore, the apparatus can be made compact.

Even when a concentrated gas flow is generated in the furnace, it is possible to quickly solve the problem caused by the concentrated gas flow, and the operation can be conducted stably. Therefore, in the case where a power generating apparatus including a boiler and turbine is installed, energy can be effectively recovered, and the power generating efficiency can be enhanced on average. In this way, energy can be saved.

What is claimed is:

1. A melting method for waste comprising:

providing a furnace having an upper portion, a drying zone positioned below the upper portion, a heat decomposing zone positioned below the drying zone, a burning and melting zone positioned below the heat decomposing zone, and a lower portion positioned below the burning and melting zone;

feeding waste material containing combustible waste substances and incombustible waste substances along with carbonic massive combustibles into the upper portion of the furnace forming packed layers for passage through the furnace;

providing lower stage tuyeres in the burning and melting zone;

feeding a lower stage burning support gas containing oxygen into said burning and melting zone from said lower stage tuyeres for burning of the carbonic massive combustibles and melting of the incombustible waste substances by said burning of the carbonic massive combustibles, said burning of the carbonic massive combustibles and said melting of the incombustible waste substances creating a burning and melting zone exhaust gas rising in the furnace toward said upper portion of said furnace;

controlling the oxygen present in the lower stage burning support gas fed from said lower stage tuyeres by providing oxygen in said burning and melting zone in an amount more than or equal to 0.8 times the stoichiometric amount of oxygen required for burning the carbonic massive combustibles;

providing upper stage tuyeres above said lower stage tuyeres, with said upper stage tuyeres located in the heat decomposing zone;

feeding an upper stage burning support gas containing oxygen into said heat decomposing zone from said upper stage tuyeres for heat decomposing said combustible waste substances, said heat decomposing of said combustible waste substances creating a decomposing zone exhaust gas rising in said furnace toward said upper portion of said furnace;

wherein the oxygen present in the upper stage burning support gas is present in a quantity such that a ratio of the quantity of oxygen present in the upper stage burning support gas to the total quantity of oxygen present in both said upper stage burning support gas and said lower stage burning support gas is 0.2 to 0.8;

wherein total oxygen present in both the upper stage burning support gas fed by said upper stage tuyeres and the lower stage burning support gas fed by said lower stage tuyeres is 130 $Nm^3$ to 600 $Nm^3$ per one ton of waste material;

drying the packed layers of waste material and carbonic massive combustibles in said drying zone by passing a combined exhaust gas comprising said burning and melting zone exhaust gas and said decomposing zone exhaust gas through the packed layers in said drying zone while maintaining the temperature of said combined exhaust gas passing through said packed layers in said drying zone in a range of between 150° C. to 700° C.;

controlling the temperature of the combined exhaust gas passing through said packed layers in said drying zone by adjusting the thickness of said packed layers.

2. A melting method for waste according to claim 1 wherein the oxygen concentration of said lower stage burning support gas is not less than 30% of the total quantity of oxygen present and oxygen concentration of said upper stage burning support gas is not greater than 21% of the total quantity of oxygen present.

3. A melting method for waste according to claim 1 wherein the carbon content of said carbonic massive combustibles is not less than 30% and the ash content of said carbonic massive combustibles is not greater than 70%, based upon the dry weight of said carbonic massive combustibles.

4. A melting method for waste according to claim 1 wherein the thickness of the packed layers satisfies the expression $H/D \geqq 1$, wherein:

H is the height of the packed layers measured from said lower stage tuyeres to an upper end of the packed layers; and, D is the minimum inner diameter of said furnace located in the melting and burning zone.

5. A melting method for waste according to claim 1 further comprising:

feeding said upper stage burning support gas from a plurality of upper stage tuyeres arranged in a cross-sectional direction of the waste melting furnace;

controlling a quantity of said upper stage burning support gas fed from said plurality of upper state tuyeres in response to a temperature measured by a plurality of thermometers arranged in a plurality of stages in a vertical direction of the wasting melting furnace, and adjusting the quantity of said upper stage burning support gas fed from said upper stage tuyeres when said detected temperature is outside of a selected range.

* * * * *